US011446933B2

(12) United States Patent
Schmidt et al.

(10) Patent No.: US 11,446,933 B2
(45) Date of Patent: Sep. 20, 2022

(54) PRINTHEAD ACCESSORY

(71) Applicant: Hewlett-Packard Development Company, L.P., Spring, TX (US)

(72) Inventors: Wayne J. Schmidt, Boise, ID (US); Wesley R. Schalk, Vancouver, WA (US); Bradley R. Larson, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/257,040

(22) PCT Filed: Jan. 31, 2019

(86) PCT No.: PCT/US2019/016025
§ 371 (c)(1),
(2) Date: Dec. 30, 2020

(87) PCT Pub. No.: WO2020/159511
PCT Pub. Date: Aug. 6, 2020

(65) Prior Publication Data
US 2021/0362515 A1 Nov. 25, 2021

(51) Int. Cl.
*B41J 3/54* (2006.01)
*B41J 2/21* (2006.01)
*B41J 11/00* (2006.01)

(52) U.S. Cl.
CPC .............. *B41J 3/546* (2013.01); *B41J 2/2103* (2013.01); *B41J 11/008* (2013.01)

(58) Field of Classification Search
CPC ......... B41J 3/546; B41J 2/2103; B41J 11/008
See application file for complete search history.

(56) References Cited

U.S. PATENT DOCUMENTS

| 5,081,596 | A | 1/1992 | Vincent et al. |
|---|---|---|---|
| 5,330,275 | A | 7/1994 | Hasewinkle |
| 5,790,915 | A | 8/1998 | Arcaro et al. |
| 6,549,223 | B2 | 4/2003 | Yamauchi |
| 6,644,784 | B2 | 11/2003 | Van Veen et al. |
| 6,862,110 | B2 | 3/2005 | Harrington |
| 7,401,877 | B2 | 7/2008 | Campbell et al. |
| 2005/0276650 | A1 | 12/2005 | Van Veen et al. |
| 2008/0150976 | A1 | 6/2008 | Evans |
| 2009/0207196 | A1 | 8/2009 | Nakahara |
| 2010/0247114 | A1* | 9/2010 | Cornell .............. G03G 21/1878 399/12 |
| 2014/0285828 | A1 | 9/2014 | Enge |

FOREIGN PATENT DOCUMENTS

| CN | 101518992 A | 9/2009 |
|---|---|---|
| CN | 202734962 U | 2/2013 |
| CN | 105365399 A | 3/2016 |

\* cited by examiner

*Primary Examiner* — Justin Seo
(74) *Attorney, Agent, or Firm* — Michael Dryja (57) ABSTRACT

In one example method, a determination is made via a processor that a document is to be printed using a printer including a printhead assembly and a printhead accessory based on a received print job. A determination is made via the processor that a first portion of the document is to be printed by the printhead assembly and a second portion is to be printed by the printhead accessory based on a characteristic of the printhead accessory. The first portion of the document is printed via the printhead assembly and the second portion of the document is printed via the printhead accessory.

15 Claims, 5 Drawing Sheets

PRINTHEAD ACCESSORY

BACKGROUND

Printheads in printers are used to deposit print agents onto print media. For example, the print agents may include a fluid such as an ink, a toner, or other forms of print agents.

BRIEF DESCRIPTION OF THE DRAWINGS

Various features of the techniques of the present application will become apparent from the following description of examples, given by way of example only, which is made with reference to the accompanying drawings, of which.

DETAILED DESCRIPTION

Some printers may use a printhead with one color or print agent to print documents efficiently. However, such printers may not be able to print a second spot color, such as a spot color used in a company logo. Moreover, it may be difficult to effectively track such printed documents. For example, embedding security patterns or other codes into documents using a single color printhead print may result in degraded image quality or be distracting. Moreover, laser toner could potentially be scrapped off a print medium to remove security patterns embedded using the laser toner. Accordingly, it may not possible to effectively track documents printed using printers having a single monochrome printhead or laser printhead. In addition, it may not be possible to efficiently print two or more colors or to print documents using two or more types of print agents. Furthermore, although printers can print color, they may have a limited color gamut.

Described herein are techniques for printing documents using a printhead accessory. As used herein, a printhead accessory refers to an optional printhead assembly. For example, a printhead accessory can be added to a compatible stand-alone printer system and may be removable and replaceable by an end user. In some examples, a printhead accessory may be manually added to a printer system to increase or improve functionality. In some examples, the printhead accessory can be replaced with printhead accessories having other print agents or print agents of different colors. In an example system, a processor in the printer can determine that a document is to be printed using a printer including a printhead assembly and a printhead accessory based on a received print job. The processor determines that a first portion of the document to be printed by the printhead assembly and a second portion to be printed by the printhead accessory based on a characteristic of the printhead accessory. The first portion of the document is printed via the printhead assembly and the second portion of the document is printed via the printhead accessory. The techniques described herein thus enable adjustable and customizable printheads of various types to be used with a single system.

In some examples, the techniques can enable spot colors to be added to a monochrome base printer. For example, a second color may be introduced into a printer using a printhead accessory. As one example, a black monochrome electrophotographic printer may have a red color printhead accessory added to provide for another color in a logo that is red and black. In some examples, the techniques also enable metadata to be included in documents using specialized print agents. As one example, the specialized print agent is an invisible fluid, such as an ultraviolet (UV) light reactive fluid or an infrared (IR) fluid. In this manner, the printed metadata may be less visually distracting or disruptive. Moreover, the use of fluidic print agents may provide for improved permanence in the case of printed security patterns. Furthermore, the techniques described herein enable multiple types of print agents to be used. For example, electrophotographically fixed toner may be combined with a fluid to generate documents with improved visual characteristics. In some examples, the techniques described herein may also enable overcoating attributes to be added to documents. For example, overcoating can include printing with an overcoat of clear fluid to change characteristics of the printed document, including color, gamut, gloss levels, water fastness, and UV protection, among other characteristics. Overcoating may also be used to provide a layer of protection for the document from fading of colors and other effects of light and heat. The techniques described herein also further enable the features described herein to be provided in a replaceable accessory device that can be used to select specific features to be added to a base printer at a lower cost than including all the features in an all-in-one integrated manner.

Figure 1:
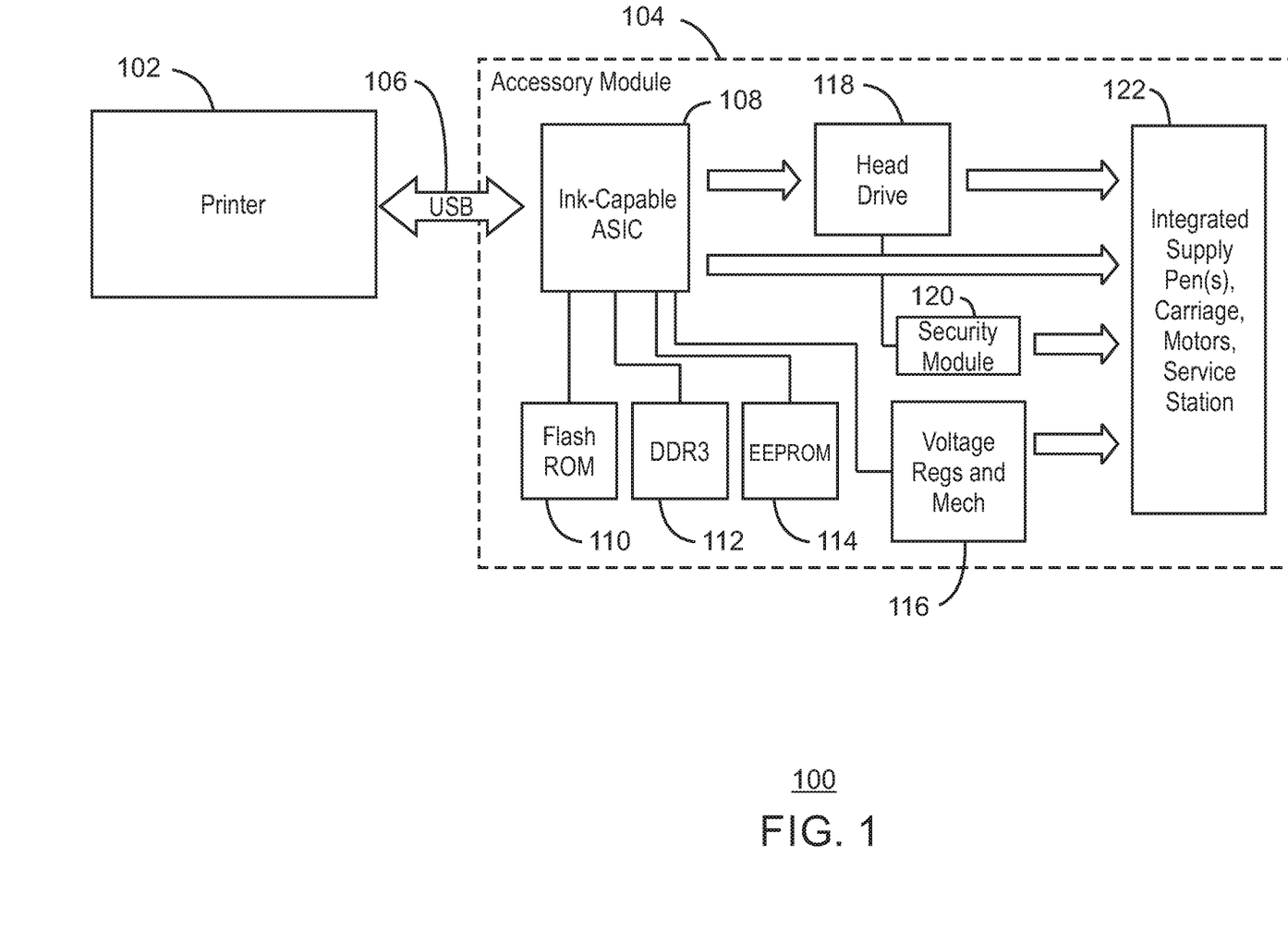
FIG. 1 is a block diagram of an example system for printing documents using a printhead accessory.

FIG. 1 is a block diagram of an example system for printing documents using a printhead accessory. The example system is generally referred to by the reference number 100. The system 100 includes a printer 102. The printer 102 may be electrically and communicatively coupled to an accessory module 104 via a universal serial bus (USB) port 106. In various examples, the USB port 106 may be any other interface, such as proprietary serial connections, serial peripheral interface (SPI), High-Speed Serial Interface (HSSI), PCIe, Ethernet connection, and the like. In an example, the accessory module 104 includes an application-specific integrated circuit (ASIC) 108. The ASIC 108 is to provide a CPU, memory, and dedicated circuitry to execute the product firmware, process the incoming data, and prepare the incoming data to drive the physical printing mechanism to produce a printed output. In some examples, the ASIC 108 is an ink-capable ASIC that can operate in conjunction with fluidic printheads. The ASIC 108 is electrically and communicatively coupled to a flash read-only memory (ROM) 110, a double data rate 3 (DDR3) synchronous dynamic random-access memory (SDRAM) 112, an electrically erasable programmable read-only memory (EEPROM) 114, and a set of voltage regulators and mechanism 116. In some examples, the voltage regulators and mechanism 116 includes an analog chip that is configured to control voltages, resets, and other power supply related matters. In various examples, the voltage regulators and mechanism 116 is also configured to control motors, gears, among other physically moving parts in the system 100. The ASIC 108 is further communicatively coupled to a head drive 118, and a security chip 120 to communicate data with the head drive 108 and the security chip 120. The ASIC 108, the voltage regulators and mechanism 116, the head drive 118, and the security chip 120 are communicatively coupled to an integrated supply pen, carriage motors, and service station 122.

In the example system 100, the accessory module 104 may be connected to the printer 102 physically via the USB connection 106. In various examples, the printer 102 may include a receiver bay with an interface, such as a USB port, for receiving the accessory module 104. The accessory module 104 may thus be removable and replaceable. For example, the accessory module 104 can be removed and replaced when the printer is in an unpowered state. In some examples, the accessory module 104 can be hot-swappable and thus be removed and replaced in a powered state. In various examples, the printer 102 includes a dedicated receiver bay for the accessory module 104. In some examples, the printer 102 includes an electrophotographic printing assembly and the receiver bay for the accessory module 104 can be located in between a finisher and a print media exit of the electrophotographic printing assembly. For example, the electrophotographic printing assembly can be a laser printing assembly. In this case, the accessory module 104 also provides paper transport (IPTU) functionality for the finisher device. In some examples, the receiver bay for the accessory module 104 is located before or after the fuser of the electrophotographic printing assembly. In some examples, the receiving bay may have an access door. In other examples, the receiving bay may have a snapping fastener that holds the accessory module 104 in the printer 102. In some examples, the accessory module 104 is placed in the paper path after transfer of toner but before fusing of the toner, such that duplex printing can be performed by the accessory module 104 on both sides of the paper.

The accessory module 104 is a stand-alone independent hardware module. For example, the accessory module 104 can be small circuit board. In various examples, the accessory module 104 has its own housing, power supply, logic board, or any combination thereof. In some examples, the accessory module 104 can be independently serviceable and replaceable. For example, the accessory module 104 can be replaced with another accessory module 104 to provide different types of print agent, different colors of print agent, etc.

The USB connection 106 is used to transfer information between the printer 102 and the accessory module 104. For example, the information can include objects to be printed, and where on a print media the object is to be printed, or the shape of the objects, among other information. In some examples, the system software of the printer 102 can be automatically updated via the USB connection 106 to support the added functionality of the accessory module 104. For example, the added functionality can be an expanded color gamut, an improved security pattern printing, gloss, light protection, etc. For example, the associated embedded web server, driver, among other software of the printer 102 can be automatically modified in response to detecting the accessory module 104 via the USB connection 106 or any other interface, such as proprietary serial connections, serial peripheral interface (SPI), High-Speed Serial Interface (HSSI), PCIe, Ethernet connection, and the like.

In some examples, the ASIC 108 is a low-cost processor to render and half-tone an image. The ASIC 108 may communicate with the head drive 118 to drive the printheads. The head drive 118 drives printheads in the integrated supply pen 122 to print onto print media. In some examples, the print accessory may be controlled by the ASIC of the printer 102 instead of using an additional ASIC for its specific control.

In various examples, the security chip 120 perform various security functions. In an example, the security chip 120 verifies that an installed print accessory device is functional and has not been modified or broken. Further, in some examples, the security chip 120 verifies that the print accessory device is authentic, and not an aftermarket clone, or that consumables of the print accessory device are genuine, or that the print accessory device is being connected to a genuine printer. In some examples, the security chip 120 may be used to enable a secure communication channel with the printer system. The flash ROM 110 includes instructions used to boot the ASIC 108. The DDR3 memory 112 is used to store intermediate data. For example, the intermediate data can include the information received from the printer 102. The EEPROM 114 can be used to store data such as configuration data, calibration information, or other data that is to persist after power is lost. The voltage regulators 116 are used to provide a stable direct current (DC) voltage to the independent of the load current, temperature, or alternating current (AC) line voltage variations.

In various examples, the accessory module 104 includes an integrated printhead. For example, the integrated printhead may have a one-inch swath. As used herein, a swath refers to a width of the printing portion of a printhead. In some examples, the integrated printhead may have a chamber containing a print agent. In some examples, the integrated printhead is included in a scanning carriage of the accessory module 104. For example, the integrated printhead is mounted in the scanning carriage. The scanning carriage is a movable carriage. As one example, the scanning carriage and supported printhead traverse over the surface of the print medium, with the nozzles ejecting droplets of print agent, at appropriate times under command of a processor, to produce a swath of droplets.

In various examples, the printer 102 includes a printhead assembly. For example, the printhead assembly can include an electrophotographic printhead or a fluidic printhead. As one example, an electrophotographic printhead may be a laser printhead. A fluidic printhead may be an inkjet printhead. In various examples, the accessory module 104 includes a carriage to mount the printhead that is a fixed carriage, also referred to herein as a stationary head. In some examples, the accessory module 104 includes a scanning carriage. In the case of an electrophotographic printhead with an accessory module 104 having a scanning carriage, the electrophotographic printing process can be temporarily delayed to allow for the scanning cartridge of the accessory module 104 to print onto areas of a print medium that have already passed through the printhead assembly. Thus, the scanning carriage of the accessory module 104 may have time to deposit a print agent by traversing over the print medium and adding additional print features, such as a spot color, security features, etc. In some examples, the delay is determined based on a size of the object to be printed by the accessory module 104. As one example, a logo or a security pattern having a width less than an inch may be printed by a scanning carriage having an inch swath without any delay. In some examples, if the size of the object to be printed by the accessory module 104 is larger than the swath of the printheads of the scanning carriage, then a short delay may be introduced to allow for printing of the larger object. As one example, the delay may be approximately 0.2 seconds.

In various examples, the accessory module 104 may alternatively include a fixed carriage with a page wide swath. In some examples, if the printhead assembly is an electrophotographic printhead, then the use of a page wide swath may allow the electrophotographic printhead to print without any temporary delays, regardless of the size of the objects to be printed by the accessory module 104.

In various examples, the printheads of the accessory module 104 can be oriented orthogonally to the direction of printing. For example, the pen can be parked and the print medium may be passed underneath without delay using a one inch swath printhead.

The block diagram of FIG. 1 is not intended to indicate that the example system 100 is to include all of the components shown in FIG. 1. Further, the system 100 may include any number of additional components not shown in FIG. 1, depending on the details of the specific implementation.

Figure 2:
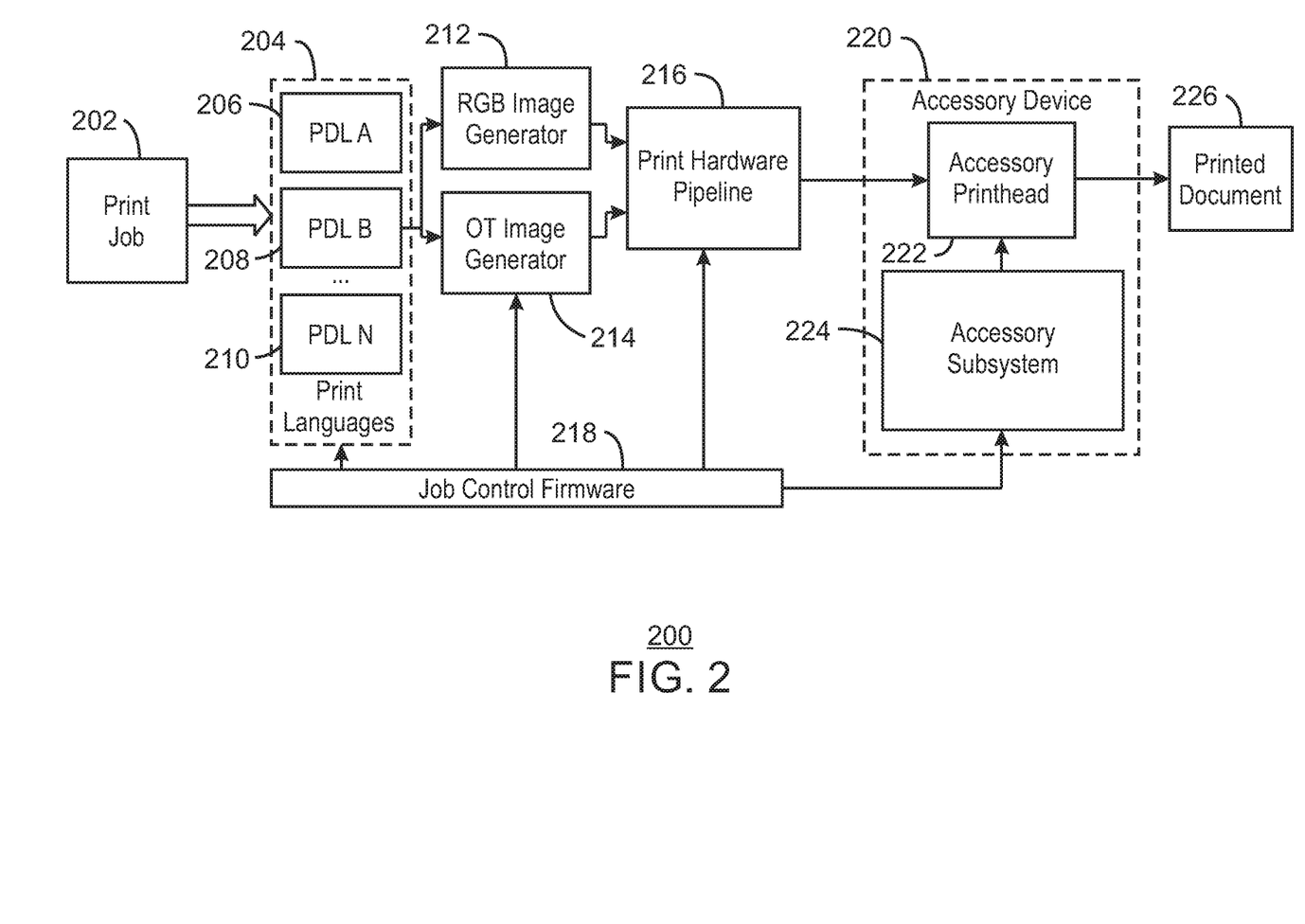
FIG. 2 is a schematic diagram illustrating an example system for printing documents using a printhead accessory.

FIG. 2 is a block diagram of an example system for printing documents using a printhead accessory. The system 200 can be implemented in the printer 102 of FIG. 1, using the method 300 of FIG. 3, the computer readable medium 400 of FIG. 4, or in the printer 500 of FIG. 5.

The system 200 includes a print job 202. The print job 202 can be in the form of a page descriptor language (PDL) and is received at a print language module 204. The print language module 204 includes a variety of PDLs, including PDL A 206, PDL B 208, and PDL N 210. The print language module 204 is communicatively coupled to a color (RGB) image generator 212 and an object type (OT) image generator 214. The RGB image generator 212 and the OT image generator 214 are communicatively coupled to a print hardware pipeline 216. For example, the print hardware pipeline 216 is a real-time, dedicated print hardware pipeline that is to print a first portion of a document. The print hardware pipeline 216 includes a printhead assembly. For example, the printhead assembly can be an electrophotographic printhead assembly or a fluid printhead assembly. The system 200 further includes a job control firmware 218 communicatively coupled to the print language module 204, the OT image generator 214, and the print hardware pipeline 216. The system 200 further includes an accessory device 220 communicatively coupled to the print hardware pipeline 216 and the job control firmware 218. The accessory device 220 includes an accessory printhead 222 to print a second portion of a document. The accessory device 220 also includes an accessory subsystem 224 communicatively coupled to the accessory printhead 222. The system 200 can be used to generate a printed document 226 having a pattern printed using the accessory printhead 222.

In the example system 200, a print job 202 is received at a printer in any suitable print language. In the example of FIG. 2, the print job 202 received is in a PDL B 208 print language. In various examples, the print job 202 can be in the PDL used can be PostScript, Printer Command Language (PCL), Portable Document Format (PDF), or any other suitable PDL format. The print language module 204 receives the print job 202 and renders an RGB image 212 and an OT image 214. The RGB image 212 is a set of pixel colors. The OT image 214 is a set of pixel types for each of the pixels. For example, each of the pixels may belong to a text object, a raster object, etc. The OT image 214 is used by the job control firmware 218 to determine how to process the RGB image 212. For example, the job control firmware 218 can determine which of the pixels in the RGB image 212 are to be printed by a printhead assembly and which of the pixels are to be printed by the accessory printhead 222. In various examples, the job control firmware 218 can automatically detect and receive information about the capabilities of the accessory printhead 222 upon powering of the system 200. In various examples, a page analysis algorithm determines which parts of a document is to be printed by the print hardware pipeline 216 and which is to be printed by the accessory printhead 222 based on relative strengths and characteristics of the print hardware pipeline 216 and accessory printhead 222. The page analysis algorithm then divides the print job 202 and directs the appropriate information to each print system. Thus, different accessory printheads 222 can be used within the same system 200 by replacing the accessory device 220, either while the system 200 is powered off or in a powered state in the case of a hot-swappable accessory device 220.

In various examples, the print hardware pipeline 216 can receive the RGB image 212, the OT image 214, and identified portion for the printhead assembly (not shown) to print from the job control firmware 218 and perform various processing to generate a pattern to be printed by the printhead assembly. In some examples, the printhead assembly is an electrophotographic printhead assembly, such as a laser printhead assembly or a light emitting diode (LED) printhead assembly. The print hardware pipeline 216 can perform enhancements, edge treatments, and half-toning, among other processing, to generate a print pattern for the printhead assembly to print. The print medium with some or all of the information in the print job 202 is then sent to the accessory device 220 for additional printing.

The accessory device 220 receives the print medium from the print hardware pipeline 216 and print job information from the job control firmware 218. In various examples, the job control firmware 218 allocates part of the print job 202 to the accessory device 220 for printing. For example, the allocated portion of the print job 202 may be a spot color to be printed in a color that is different from the color of the toner or ink of the print hardware pipeline 216. In this example, the job control firmware 218 detects the spot color capabilities of the accessory device 220 and the portion of the print job 202 corresponding to the spot color and sends the portion of the print job 202 corresponding to the spot color to the accessory device 220 for printing. In some examples, the job control firmware 218 allocates additional information to the accessory device 220, such as metadata to be encoded into the print medium using the accessory device 220. In these examples, the job control firmware 218 can communicate with a server to receive the metadata or generate the metadata internally. For example, the metadata can include information such as a job ID for each print job, a time stamp associated with each print job, date associated with each print job, a printer model, among other information. In various examples, the job control firmware 218 can also render the metadata into a pattern to be printed by the accessory device 220. In some examples, the job control firmware 218 sends the metadata to the accessory subsystem 224 for rendering into the pattern. The printed pattern encoding the metadata can then be used to distinguish a printed medium from other prints. In some examples, the job control firmware 218 can instruct the accessory device 220 to apply a specialized print agent onto print the print medium. For example, the specialized print agent may be an invisible ink or a protective overcoat. In some examples, metadata is encoded into the print medium using invisible ink, such as UV ink or IR ink. In some examples, the printhead accessory includes a number of print agents. For example, the number of print agents can include print agents of different colors, or different types. In some examples, the print medium is covered with a print agent that is a protective overcoat fluid. As one example, the printed portions of the print medium are covered with an overcoat to protect against fading due to UV light, etc. Therefore, in some examples, the job control firmware 218 also sends the print job information that is sent to the print hardware pipeline 216 to the accessory subsystem 224.

In various examples, the accessory subsystem 224 can render and store patterns, spot color information, or overcoat patterns based on the information received from the job control firmware 218. In some examples, the accessory subsystem 224 also include a printhead controller (not shown) to control the accessory printhead 222. For example, the printhead controller may cause the accessory printhead 222 to dispense fluid at a particular time as the print medium is passing under the accessory printhead. In some examples, the job control firmware 218 can cause the print medium to temporarily stop moving such that the accessory printhead 222 can traverse the print medium to print areas of the print medium that are larger than a swath of the accessory printhead 222.

The block diagram of FIG. 2 is not intended to indicate that the example system 200 is to include all of the components shown in FIG. 2. Further, the system 200 may include any number of additional components not shown in FIG. 2, depending on the details of the specific implementation.

Figure 3:
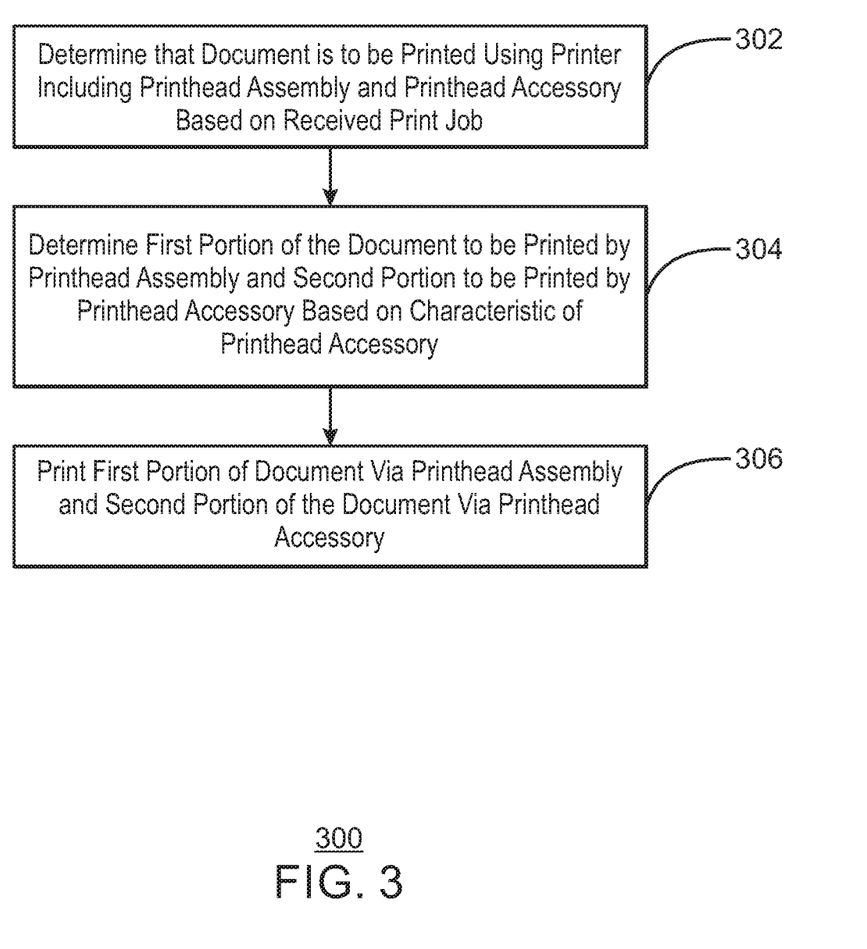
FIG. 3 is a process flow diagram illustrating an example method for printing documents using a printhead accessory.

FIG. 3 is a process flow diagram illustrating an example method for printing documents using a printhead accessory. The method 300 of FIG. 3 can be implemented in the systems 100 or 200 of FIGS. 1 and 2 or the computer-readable medium 400 of FIG. 4 or printer 500 of FIG. 5.

At block 302, a process determines that a document is to be printed using a printer including a printhead assembly and a printhead accessory based on a received print job. In various examples, the processor detects the printhead accessory and automatically determines the first portion and the second portion based on the characteristic of the printhead accessory. In some examples, the first portion and the second portion can be specified by a user and received as part of the print job. For example, a light production environment, a skilled operator may manually indicate which portions should be printed by either the printer or the accessory. As one example, the first portion and second portion can be specified in the case where a special spot color is mixed to be dispensed, such a company's specific color for a logo. The processor also generates a first portion printing information sent to the printhead assembly and a second portion printing information sent to the printhead accessory.

At block 304, the processor determines that a first portion of the document to be printed by the printhead assembly and a second portion to be printed by the printhead accessory based on a characteristic of the printhead accessory. In various examples, the processor modifies the second portion of the document based on a velocity of a print medium and an angle of a fluid nozzle trajectory. For example, the processor can detect a spot color portion of the document to be printed by the printhead accessory and send the spot color portion of the document to the printhead accessory for printing after the first portion is printed by the printhead assembly. As one example, if the first portion of the document to be printed is in a black color and the second portion of the document to be printed is in another color, then the processor can detect portions of the document to be printed in the color and send the portions to the printhead accessory for printing. In various examples, the second portion of the document can include part of the first portion. For example, in the case of an overcoat to be applied by the printhead accessory, the second portion of the document can be the same as the first portion. In various examples, the second portion of the document is generated by the processor. As one example, the second portion is a security pattern that is generated based on metadata and printed using the printhead accessory. For example, the security pattern can be printed using an invisible fluid, such as a UV fluid or an IR fluid. In some examples, the processor can detect bordering colors and include the portion of the document with bordering colors in the second portion to be printed by the printhead accessory. For example, the printhead accessory can include multiple fluid colors. In some examples, the multiple fluid colors can include the color of toner used by the printhead assembly. Thus, the printhead accessory can be used to print bordering colors in order to prevent fluid from being printed onto toner and the smearing off the fluid on toner after printing, or to improve the visual print quality or other attribute of the resulting print.

At block 306, the first portion of the document is printed via the printhead assembly and the second portion of the document is printed via the printhead accessory. In various examples, a registration of the print medium is maintained for printing the second portion of the document. For example, maintaining the registration can include maintaining a grip on a print medium after printing the first portion. In some examples, maintaining the registration includes detecting an edge of a print medium via a sensor of the printhead accessory after printing the first portion of the document, registering to the detected edge, and printing the second portion of the document. In various examples, maintaining the registration includes both maintaining the grip and registering to a detected edge. In some examples, the processor analyzes a location of the printed first portion via an in-line scanner or an in-line sensor of the printer and adjusts a timing of the printing the second portion of the document based on the location of the printed first portion.

It is to be understood that the process diagram of FIG. 3 is not intended to indicate that all of the elements of the method 300 are to be included in every case. Further, any number of additional elements not shown in FIG. 3 may be included in the method 300, depending on the details of the specific implementation. In various examples, the method 300 may include providing intermediate paper transport unit (IPTU) functionality via the printhead accessory during printing.

Figure 4:
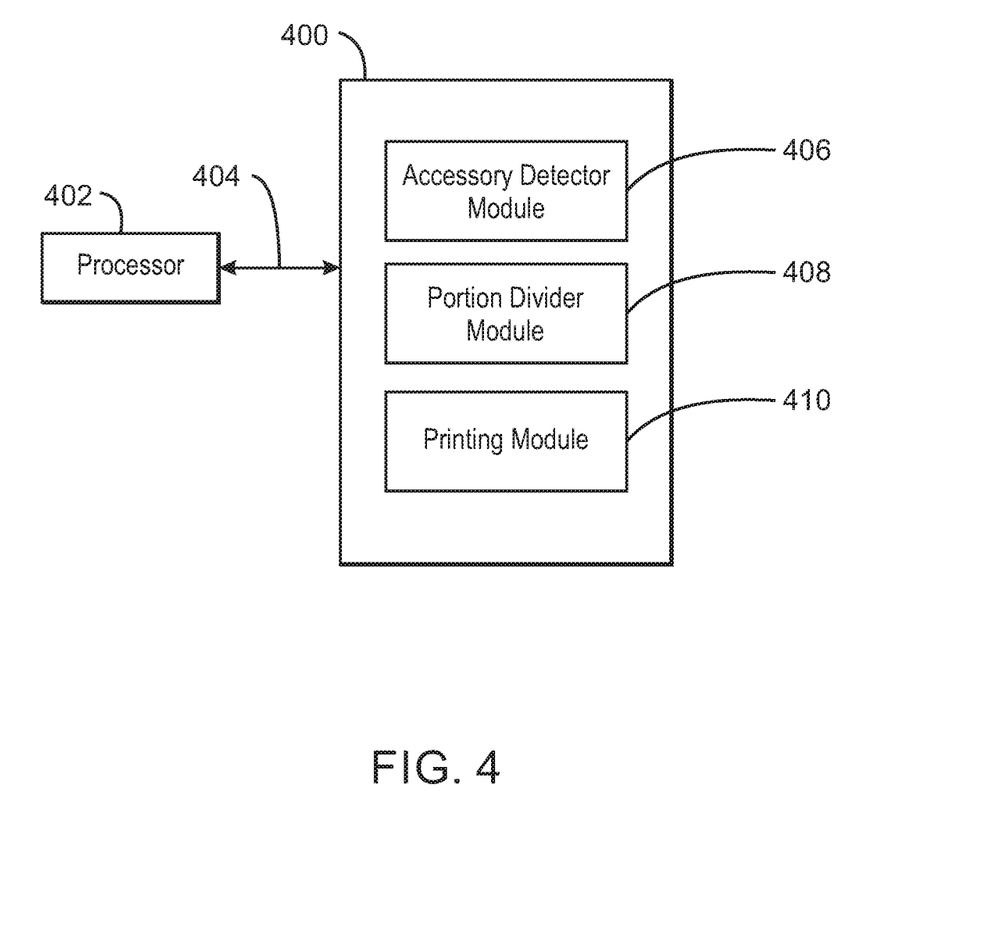
FIG. 4 is a block diagram of an example machine-readable storage medium that can be used to print documents using a printhead accessory.

FIG. 4 is a block diagram showing a tangible, non-transitory, machine-readable storage medium that stores code to direct a processor to print documents using a printhead accessory. The machine-readable medium is generally referred to by the reference number 400. The machine-readable medium 400 can include RAM, a hard disk drive, an array of hard disk drives, an optical drive, an array of optical drives, a non-volatile memory, a flash drive, a digital versatile disk (DVD), or a compact disk (CD), among others. The machine-readable storage medium 400 may be accessed by a processor 402 over a bus 404. The processor 402 may be a processor of a printer, such as the processor 506 of the printer 500 of FIG. 5. In some examples, the processor 402 may be a field-programmable gate array (FPGA) processor and/or an ASIC processor. Furthermore, as indicated, the machine-readable medium 400 may include code configured to perform the methods and techniques described herein. Indeed, the various logic components discussed herein may be stored on the machine-readable medium 400. Portions 406, 408, and 410 of the machine-readable storage medium 400 can include accessory detector module code, portion divider module code, and printing module code, respectively, which may be executable code (machine readable instructions) that direct a processor or controller in performing the techniques discussed with respect to the preceding figures.

Indeed, the various logic (e.g., instructions, code) components discussed herein may be stored on the tangible, non-transitory machine-readable medium 400 as indicated in FIG. 4. For example, the machine-readable medium 400 may include the accessory detector module code 406 that, when executed by a processor, direct the processor or a computing device to detect a printhead accessory. In some examples, the accessory detector module 406 can direct the processor or computing device to determine that a document is to be printed using a printer including a printhead assembly and a printhead accessory based on a received print job.

The machine-readable medium 400 may also include portion divider module code 408 that when executed by a processor to direct the processor or a computing device to determine a first portion of the document to be printed by the printhead assembly and a second portion to be printed by the printhead accessory based on a characteristic of the printhead accessory. For example, the characteristic of the printhead accessory can be the type of print agent used, the color of the print agent used, or the portion remaining of a print agent used. As one example, the printhead accessory is used as a reserve printing agent that is used in response to detecting that a printing agent in the printhead assembly is low or empty. In some examples, the printhead accessory is used to print the same color as the printhead assembly but using a different type of printing agent. Thus, in one example, if an electrophotographic printhead assembly is low in black toner, then the black fluid printing agent of a printhead accessory is used. In another example, the black fluid printing agent may be low or empty, and the toner is used to print the same color. In some examples, a specialty spot color may be mixed and installed for a specific print job. In this example, the printhead accessory is used to add an additional color to generate a specialty spot color. In various examples, the characteristics of the printhead accessory can also include a mechanical characteristic. For example, one or more of the mechanical characteristics of the accessory printhead may be complementary to the printing method of the printhead assembly. In some examples, the mechanical characteristic may be the mechanical operation of different printheads. For example, different fluidic printheads may have different mechanical characteristics.

In some examples, the portion divider module code 408 can direct the processor or computing device to automatically determine the first portion and the second portion based on the characteristic of the printhead accessory, and generate a first portion printing information sent to the printhead assembly and a second portion printing information sent to the printhead accessory. Further, the portion divider module code 408 can direct the processor or computing device to modify the second portion of the document based on a velocity of a print medium and an angle of a fluid nozzle trajectory.

The machine-readable medium 400 may further include printing module code 410 that, when executed by a processor, direct the processor or a computing device to print the first portion of the document via the printhead assembly and the second portion of the document via the printhead accessory. For example, the printing module code 410 can direct the processor or computing device to analyze a location of the printed first portion via an in-line scanner or an in-line sensor of the printer and adjust a timing of the printing the second portion of the document based on the location of the printed first portion. In some examples, the printing module code 410 can direct the processor or computing device to detect an edge of a print medium via a sensor of the printhead accessory after printing the first portion of the document, register to the detected edge, and print the second portion of the document based on the registered edge.

Although shown as contiguous blocks, the logic components may be stored in any order or configuration. For example, if the machine-readable medium 400 is a hard drive, the logic components may be stored in non-contiguous, or even overlapping, sectors.

Figure 5:
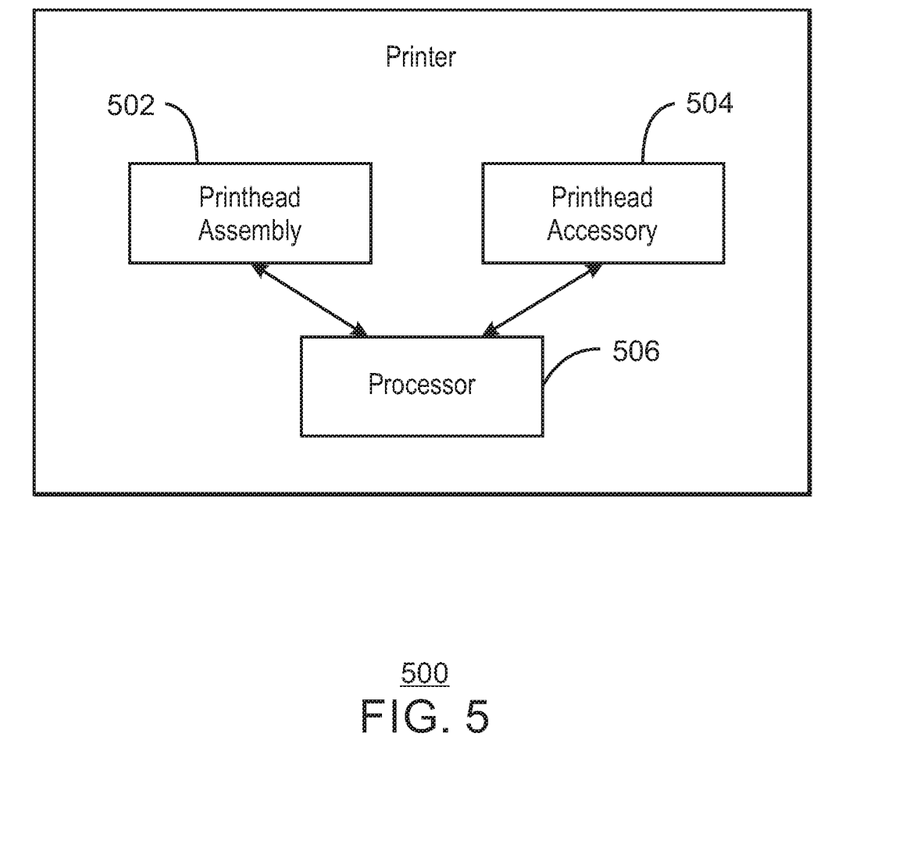
FIG. 5 is a block diagram of an example printer for printing documents using a printhead accessory.

FIG. 5 is a block diagram of an example printer for printing documents using a printhead accessory. The printer 500 can be implemented using the system 100 or 200 of FIGS. 1 and 2 using the method 300 of FIG. 3 or the computer-readable medium 400 of FIG. 4.

The printer 500 of FIG. 5 includes a printhead assembly 502, a printhead accessory 504, and a processor 506. The processor 506 is communicatively coupled to both the printhead assembly 502 and the printhead accessory 504 as indicated by dual sided arrows.

In the example of FIG. 5, the printhead assembly 502 of printer 500 is used to print a first portion of a document. For example, the printhead assembly 502 can be an electrophotographic printhead assembly, such as a laser printhead assembly or LED printhead assembly, or a fluidic printhead assembly, such as an inkjet printhead assembly. In some examples, the first portion of the document includes a text or diagram.

The printhead accessory 504 is used to print a second portion of the document. The printhead accessory 504 includes a printhead can be electrophotographic printhead or a fluidic printhead. In various examples, an inkjet printhead can be a piezoelectric printhead, a thermal inkjet printhead, etc. In some examples, the second portion of the document is printed in an area of the document that is separate from the first portion of the document. For example, color portions of a document may be printed by the printhead accessory 504 while black portions of the document are printed by the printhead assembly 502. As another example, the printhead accessory 504 can print a security pattern in areas of the document that do not contain printing from printhead assembly 502. In some examples, the second portion of the document is a color logo, a security pattern, or both. In various examples, the printhead accessory 504 is an electrophotographic printhead assembly, an inkjet printhead assembly, or a wax printhead assembly. The printhead accessory 504 can print using a print agent such as toner, a fluid such as an ink, or a wax. In some examples, the printhead accessory can print using a specialized print agent. For example, the specialized print agent can include a spot color or a specialized marking agent. In various examples, the specialized marking agent is an ultraviolent (UV) fluid. In some examples, the printhead accessory 504 includes a number of print agents. For example, the number of print agents can include print agents of different colors, or different types.

In some examples, the printhead accessory 504 includes an inline sensor. The inline sensor can be used to maintain or establish registration of the print medium after printing with the printhead assembly. For example, the inline sensor is used to detect the position and orientation of a print medium after being printed by the printhead assembly 502 and before being printed by the printhead accessory. In various examples, the printhead accessory is a scanning head assembly or a stationary head assembly. In some examples, the printhead accessory 504 also includes intermediate paper transport unit (IPTU) functionality.

The processor 506 determines the first portion of the document and the second portion of the document based, at least in part, on a received print job and a detected characteristic of the printhead accessory. In some examples, the processor 506 generates metadata including information to be printed by the printhead accessory, wherein the information is additional to the document. For example, the metadata can include document ID information.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the scope of the appended claims.

What is claimed is:

1. A method comprising:
    determining, via a processor, that a document is to be printed using a printer comprising a printhead assembly and a printhead accessory based on a received print job;
    determining, via the processor, that a first portion of the document is to be printed by the printhead assembly and a second portion is to be printed by the printhead accessory based on a detected characteristic of the printhead accessory; and
    printing the first portion of the document via the printhead assembly and the second portion of the document via the printhead accessory.

2. The method of claim 1, comprising detecting the printhead accessory, and automatically determining the first portion and the second portion based on the characteristic of the printhead accessory, and generating a first portion printing information sent to the printhead assembly and a second portion printing information sent to the printhead accessory.

3. The method of claim 1, comprising modifying the second portion of the document based on a velocity of a print medium and an angle of a fluid nozzle trajectory.

4. The method of claim 1, comprising analyzing a location of the printed first portion via an in-line scanner or an in-line sensor of the printer and adjusting a timing of printing the second portion of the document based on the location of the printed first portion.

5. The method of claim 1, comprising maintaining registration of a medium for printing the second portion of the document, wherein maintaining the registration of the print medium comprises:
    maintaining a grip on a print medium after printing the first portion;
    detecting an edge of a print medium via a sensor of the printhead accessory after printing the first portion of the document, registering to the detected edge, and printing the second portion of the document; or
    both maintaining the grip and detecting the edge and registering to the detected edge.

6. The method of claim 1, comprising providing intermediate paper transport unit (IPTU) functionality via the printhead accessory during printing.

7. A printer, comprising:
    a printhead assembly to print a first portion of a document;
    a printhead accessory to print a second portion of the document; and
    a processor to determine the first portion of the document and the second portion of the document based, at least in part, on a received print job and a detected characteristic of the printhead accessory.

8. The printer of claim 7, wherein the printhead assembly comprises an electrophotographic printhead assembly or fluidic printhead assembly and the printhead accessory comprises an electrophotographic printhead assembly, a fluidic printhead assembly, or a wax printhead assembly.

9. The printer of claim 7, wherein the printhead accessory includes an inline sensor.

10. The printer of claim 7, wherein the processor is to generate metadata comprising information to be printed by the printhead accessory, wherein the information is additional to the document.

11. The printer of claim 7, wherein the printhead accessory comprises a scanning head assembly or a stationary head assembly.

12. The printer of claim 7, wherein printhead accessory comprises intermediate paper transport unit (IPTU) functionality.

13. The printer of claim 7, wherein the second portion of the document is printed in an area of the document that is separate from the first portion of the document.

14. The printer of claim 7, wherein the printhead accessory comprises a specialized print agent comprising a spot color, a specialized marking agent, or both.

15. The printer of claim 7, wherein the first portion of the document comprises a text or diagram and the second portion of the document comprises a color logo, a security pattern, or both.

* * * * *